Dec. 16, 1958  C. E. SEGLEM ET AL  2,864,234
IGNITER FOR GAS TURBINE ENGINES
Original Filed Oct. 11, 1954  2 Sheets-Sheet 1
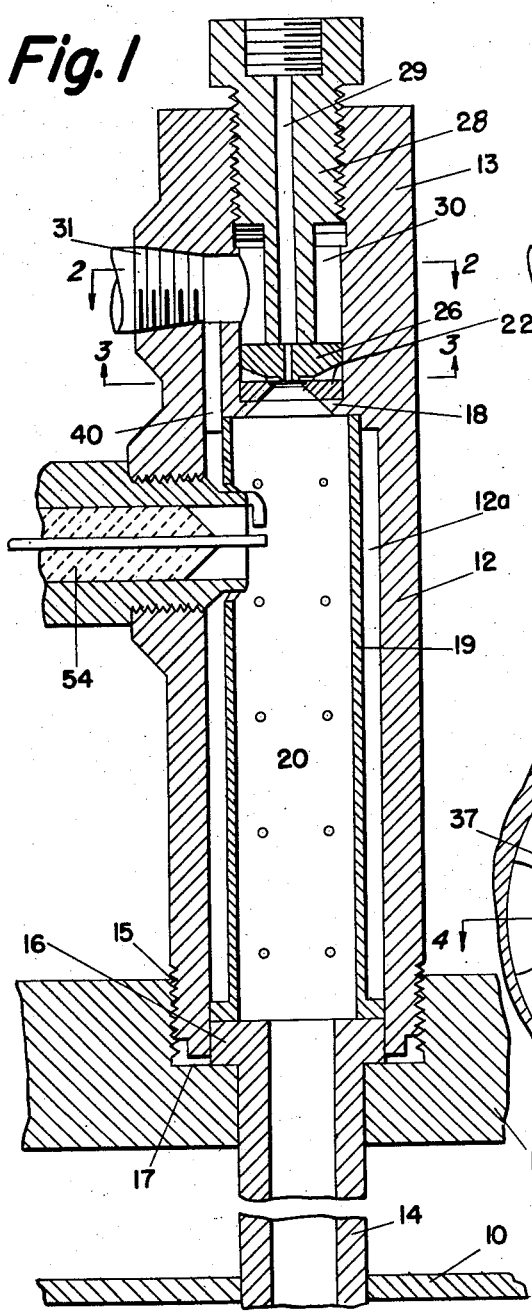
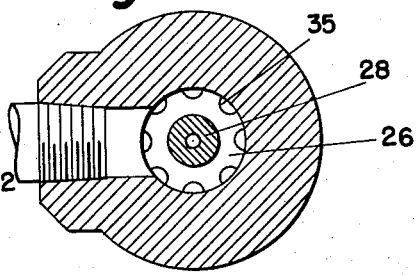
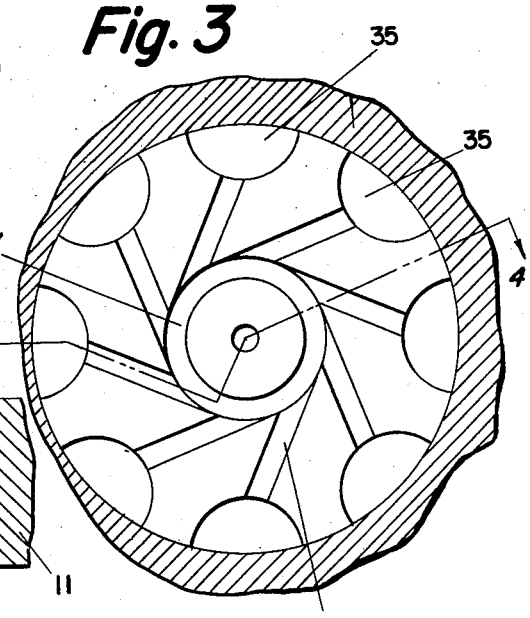
INVENTOR.
CLIFFORD E. SEGLEM
STEWART WAY

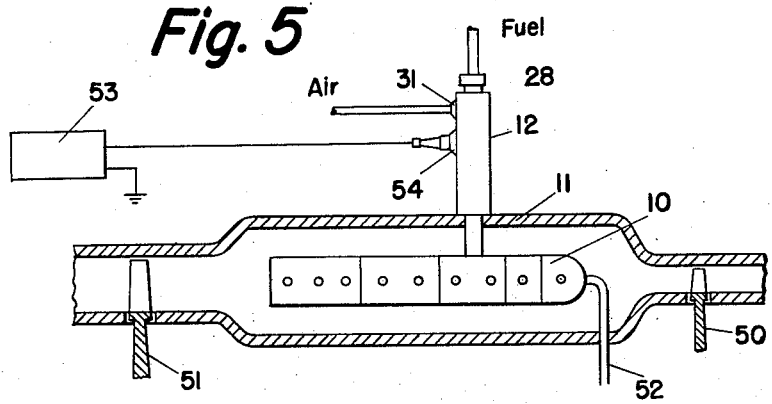
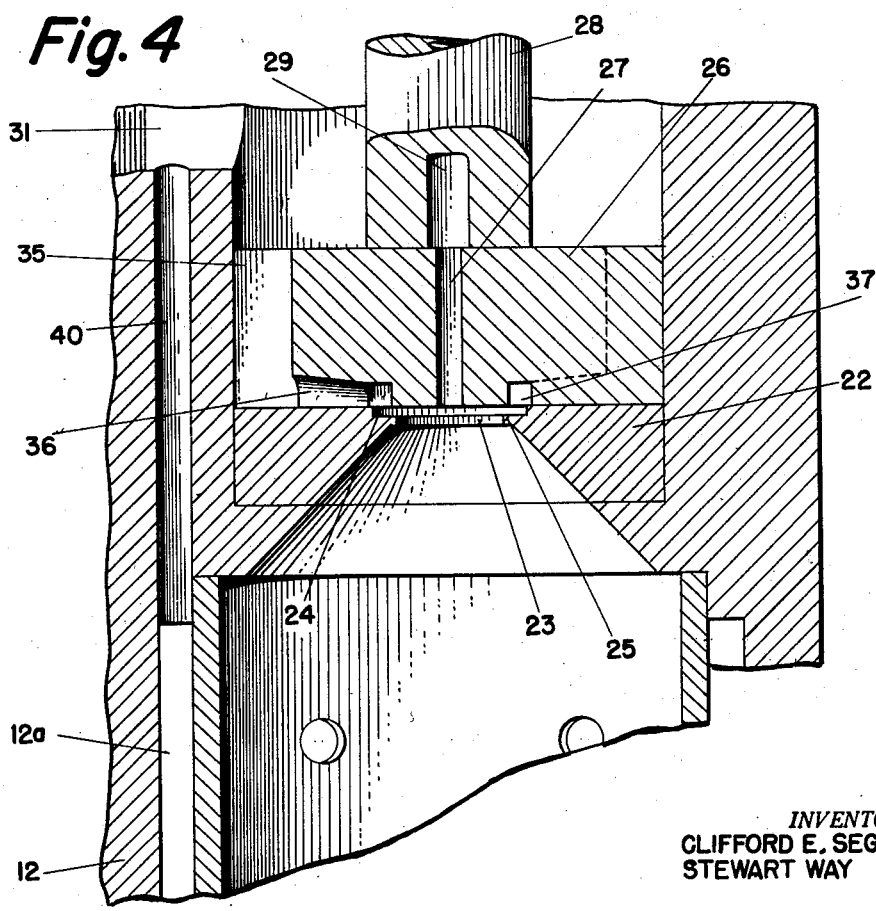

United States Patent Office 2,864,234
Patented Dec. 16, 1958

2,864,234

IGNITER FOR GAS TURBINE ENGINES

Clifford E. Seglem, Wallingford, and Stewart Way, Pittsburgh, Pa., assignors, by mesne assignments, to the United States of America as represented by the Secretary of the Navy Continuation of application Serial No. 461,700, October 11, 1954. This application September 13, 1956, Serial No. 609,784

3 Claims. (Cl. 60—39.82)

This invention relates to gas-turbine engines of the type which comprises a compressor section and a turbine section which during operation deliver compressed air through a combustion chamber to which fuel is supplied and wherein combustion is effected to provide motive power.

The invention has for its principal object the provision of means for igniting combustion reactants in and maintaining combustion in the combustion chamber in order to insure efficient and proper operation of a gas turbine engine.

It is another object of the invention to provide igniter structure which is arranged to inject a flame into the combustion chamber of a gas turbine engine in order to insure the combustion of fuel therein.

Other objects and advantages of the invention will hereinafter become more fully apparent from the following description of the annexed drawings which illustrate one embodiment of the invention.

According to the present invention an igniter is provided and forms an elongate continuous passageway providing a central ignition zone; an inlet end portion which is arranged to receive independent streams of fuel and air and is also arranged to intermix the streams and to atomize the fuel prior to its admission to the ignition zone and an outlet end portion in communication with the combustion chamber of a gas-turbine engine. The atomized mixture delivered to the ignition zone is ignited and forms a flame which is injected into the combustion chamber of the gas-turbine engine through the outlet end portion of the igniter.

For a more detailed explanation of the invention reference may be had to the accompanying drawings wherein:

Fig. 1 is a view in vertical section of the igniter arranged in operative relation with a combustion chamber;

Fig. 2 is a sectional view on the line 2—2 of Fig. 1 in the direction of the arrows;

Fig. 3 is a sectional view generally on the line 3—3 of Fig. 1 in the direction of the arrows and with portions broken away;

Fig. 4 is a sectional view on the line 4—4 of Fig. 3; and

Fig. 5 is a diagrammatic view in partial section of a gas turbine engine and the igniter assembly.

In Figs. 1 and 5 of the drawings, 10 represents a combustion chamber of a gas turbine engine wherein the primary combustion is to be carried out and 11 represents an enclosure for the combustion chamber and other elements of a gas turbine engine.

The igniter structure is made up of a housing indicated at 12 having an inlet section 13 integral therewith and an independently formed outlet section 14 which is in communication with the combustion chamber 10.

The housing 12 is generally cylindrical forming a central passageway 12a of relatively enlarged diameter and an inlet passageway of smaller diameter, and the lower end of the housing is screw threadedly secured in a recess 15 in the enclosure 11 as indicated in Fig. 1. The outlet section 14 of the housing is provided at its upper end with an annular flange 16 which is received on the flange 17 of the recess 15 and communicates with the lower end of the passageway 12a. At the upper end of the passageway 12a is provided an inwardly extending annular flange 18 and an apertured cylindrical partition 19 has its lower end disposed on the flange 16 of the outlet section 14 and its upper end disposed in abutting relation with the flange 18 and provides a central ignition chamber 20.

The passageway in the inlet end 13 of the igniter above the inwardly extending flange 18 receives several elements for mixing and atomizing the fuel prior to its injection into the ignition chamber 20. The elements comprise an annular plate 22 shown in Figs. 1 and 4 and is provided with a central aperture 23 which emerges from an enlarged recess 24 in the upper face of the plate providing therewith an annular flange 25. An atomizing disk 26 is supported directly on plate 22 and has a central aperture 27 which is aligned with the aperture 23. An insert 28, as shown in Fig. 1, is screw threadedly mounted in the inlet section 13 of the housing and is also provided with a central bore 29, which is aligned with the aperture 27 in the atomizing disk 26.

The insert 28 has its lower end in pressure contact with the atomizer disk and its lower end portion is provided with an annular channel providing a reduced diameter portion and forming an air compartment 30 with the inner wall of the housing. A lateral opening 31 is provided in the housing wall, is in communication with the compartment 30, and is adapted to receive a conduit for supplying air to the compartment while the upper end of the insert 28 is adapted at its upper end to receive a conduit for supplying fuel directly to the bore 29 and into the ignition chamber 20.

The atomizing disk 26, as shown in Figs. 2, 3 and 4, is provided with flutes 35 which extend longitudinally of the disk periphery providing a peripheral fluted area. As shown in Figs. 3 and 4, the bottom of the disk is provided with a plurality of inwardly extending grooves 36 each of which communicates with one of the flutes 35 and all of which communicate with an annular chamber 37 which is generally centrally of the disk providing a continuous passageway from the compartment 30 through the flutes, the grooves, and into the annular chamber 37. The annular chamber 37, as shown in Fig. 4, is disposed directly above the recess 24; and air supplied to the annular chamber 37 will in effect swirl across the flange 25 and pick up or intermix with fuel from aperture 27, in the enlarged recess 24; and the intermixed or atomized mixture will be supplied through the aperture 23 into the ignition zone 30. One or more longitudinal passageways 40 additionally are provided between the air inlet 31 and the central chamber 12a to provide an arrangement for supplying air directly to the ignition chamber 20 through the apertured partition 19.

From the description of the atomizing assembly it will be understood that fuel supplied, for example, to the bore 29 of the insert 28 will pass directly through apertures 27 and 23 and into the ignition zone 20. Air which is supplied through inlet 31 will pass into compartment 30; the longitudinal flutes 35; inwardly extending grooves 36 and into the annular chamber 37 from which it will impinge on or swirl across the inner annular flange 25 of the plate 22 and intermix with the fuel in the mixing or atomizing zone formed by recess 24; and the mixture delivered in atomized condition to the ignition chamber or ignition zone 20.

Referring to Fig. 5 for a general explanation of operation, the compressor and turbine sections, of a gas turbine engine, which are exemplified by the blades 50 and 51 respectively, are initially operated by an external power source; and air under pressure passes through the housing 11 and into the combustion chamber 10. Fuel is supplied to the combustion chamber through fuel line 52 and is mixed with the air therein and a flame will be produced in the ignition chamber 20 by the ignition equipment consisting of the battery 53 and spark plug 54. The flame so produced in the chamber 20 will be forced into the combustion chamber 10 by the passage of the incoming air and fuel supplied to the ignitor as before explained.

This application is a continuation or substitute application for application Serial No. 461,700 filed October 11, 1954, which is now abandoned.

Obviously many modifications and variations of the present invention are possible in the light of the above teachings. It is therefore to be understood that within the scope of the appended claims the invention may be practiced otherwise than as specifically described.

What is claimed is:

1. In combination, combustion apparatus and an igniter therefor comprising an elongate tubular housing, a first inwardly extending annular flange at one end of the housing providing an outlet section, a second inwardly extending annular flange at the other end of the housing providing an inlet section and said flanges forming therebetween a central chamber in communication with both said outlet section and said inlet section, a centrally apertured annular plate in the inlet section and positioned on said second flange, a centrally apertured atomizing disk in the inlet section having one face abutting said annular plate, an insert in the inlet section having an axial bore therein coinciding with the central apertures in the annular plate and atomizing disk for passage of fuel from the inlet section to the central chamber, said insert having an enlarged outer end portion secured in the inlet section and a reduced inner end portion abutting the other face of the atomizing disk and forming with the housing inner wall an annular air compartment, a lateral opening in the housing wall in communication with said annular air compartment for supplying air thereto, an annular groove in one face of the atomizing disk surrounding its central aperture, a plurality of passageways in the atomizing disk providing communication between the annular air compartment and the annular groove in the atomizing disk, said second annular flange having an enlarged recess therein in communication with the apertures and annular groove in the atomizing disk providing a chamber for mixing fuel and air before its admission to the central chamber and ignition means in the central chamber for igniting the mixture prior to its injection into the combustion chamber.

2. Apparatus as in claim 1 further characterized by a perforate cylinder in the central chamber spaced from the wall of the housing and providing an outer air distribution zone and an inner ignition chamber and a passageway between the air inlet and the air distribution zone.

3. Apparatus as in claim 1 further characterized by the passageways in the atomizing disk comprising a plurality of flutes in the outer periphery of the disk, each being in communication at one end with the annular compartment and at its other end with one of a series of passageways which radiate from the annular groove in the disk.

References Cited in the file of this patent

UNITED STATES PATENTS

| | | |
|---|---|---|
| 1,023,707 | Anthony | Apr. 16, 1912 |
| 1,413,113 | Good | Apr. 18, 1922 |
| 1,456,188 | Noe et al. | May 22, 1923 |
| 2,744,384 | Loughran | May 8, 1956 |

FOREIGN PATENTS

| | | |
|---|---|---|
| 628,366 | Great Britain | Aug. 26, 1949 |